United States Patent
Lee et al.

(10) Patent No.: US 9,960,439 B2
(45) Date of Patent: May 1, 2018

(54) APPARATUS AND METHOD FOR CONTROLLING HYDROGEN PURGING

(71) Applicants: Hyundai Motor Company, Seoul (KR); Kia Motors Corporation, Seoul (KR)

(72) Inventors: Heon Joong Lee, Seoul (KR); Sang Uk Kwon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 168 days.

(21) Appl. No.: 14/329,376

(22) Filed: Jul. 11, 2014

(65) Prior Publication Data

US 2015/0180069 A1  Jun. 25, 2015

(30) Foreign Application Priority Data

Dec. 19, 2013  (KR) .................. 10-2013-0159651

(51) Int. Cl.
   *H01M 8/04* (2016.01)
   *H01M 8/04746* (2016.01)
   *H01M 8/04537* (2016.01)
   *H01M 8/04223* (2016.01)

(52) U.S. Cl.
   CPC ... *H01M 8/04761* (2013.01); *H01M 8/04231* (2013.01); *H01M 8/04589* (2013.01); *H01M 8/04619* (2013.01)

(58) Field of Classification Search
   CPC ......... H01M 8/04231; H01M 8/04589; H01M 8/04619
   See application file for complete search history.

(56) References Cited

U.S. PATENT DOCUMENTS

2007/0026276 A1*  2/2007  Ogawa .............. H01M 8/04231
                                                                   429/414

FOREIGN PATENT DOCUMENTS

| JP | 2006-309971 | 11/2006 |
|----|-------------|---------|
| JP | 2007-035389 A | 2/2007 |
| JP | 2010-199038 | 9/2010 |
| KR | 10-2009-0055053 | 6/2009 |
| KR | 10-2010-0066579 | 6/2010 |

* cited by examiner

*Primary Examiner* — Stephan Essex
(74) *Attorney, Agent, or Firm* — Mintz Levin Cohn Ferris Glovsky and Popeo, P.C.; Peter F. Corless

(57) ABSTRACT

An apparatus and method for controlling hydrogen purging are provided. The apparatus includes a purging valve that is provided for an outlet disposed adjacent to an anode of a fuel cell stack and is configured to adjust an outflow of water from the fuel cell stack. In addition, a controller is configured to adjust an opening of the purging valve according to a charge capacity obtained by integrating a current of the fuel cell stack. The controller is configured to calculate the charge capacity by multiplying the current of the fuel cell stack by a scale factor when a load for an output current of the fuel cell stack is less than a first reference load which is preset.

6 Claims, 2 Drawing Sheets

APPARATUS AND METHOD FOR CONTROLLING HYDROGEN PURGING

CROSS REFERENCE TO RELATED APPLICATION

The present application claims priority of Korean Patent Application Number 10-2013-0159651 filed on Dec. 19, 2013, the entire contents of which application are incorporated herein for all purposes by this reference.

BACKGROUND

Field of the Invention

The present invention relates to an apparatus and method for controlling hydrogen purging, and more particularly to an apparatus and method for hydrogen purging, which varies a period of hydrogen purging by varying a current.

Description of the Related Art

A fuel cell vehicle includes a fuel cell stack in which a plurality of individual fuel cells are stacked, a fuel supply system to supply hydrogen, etc. that operates as fuel to the fuel cell stack, an air supply stem to supply oxygen that operates as an oxidant required to cause an electrochemical reaction, and a water and heat management system to adjust the temperature of the fuel cell stack.

The fuel supply system supplies hydrogen to a fuel electrode (e.g., anode) of the fuel cell stack by reducing the pressure of compressed hydrogen stored in a hydrogen tank, and the air supply system supplies external air to an air electrode (e.g., cathode) of the fuel cell stack using an air blower. When oxygen is supplied to the fuel electrode of the fuel cell stack and when air is supplied to the air electrode, hydrogen ions are generated through a catalytic reaction on the fuel electrode. The generated hydrogen ions migrate through an electrolyte membrane and reach the air electrode operating as an oxidation electrode. In the oxidation electrode, the hydrogen ions cause an electrochemical reaction with electrons and oxygen, producing energy. In particular, an electrochemical oxidation reaction with hydrogen occurs on the fuel electrode and an electrochemical reduction reaction with oxygen occurs on the air electrode. Accordingly, electricity and heat are produced due to movement of electrons and vapor or water is produced through a chemical reaction between hydrogen and oxygen.

The fuel cell vehicle further includes a discharging apparatus that discharges byproducts, such as vapor, water, and heat generated during the production of energy, and unused gases such as hydrogen and oxygen. The vapor and gases such as hydrogen and oxide are discharged via an exhaust duct. The air blower, a hydrogen circulating blower, and a water pump are connected to a main bus to facilitate startup of the fuel cell. The main bus is also connected to various relays which facilitate interruption and supply of power, and to a diode which prevents a backward current from flowing to the fuel cells. Dry air which is supplied by the air blower is dampened by a humidifier, and then the damp air is supplied to the air electrode (cathode) of the fuel cell stack. Exhaust gas generated from the cathode is a damp gas and is supplied to the humidifier so that it is used to dampen the dry air which is to be supplied to the cathode by the air blower.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus and method for controlling hydrogen purging that varies a period of hydrogen purging by varying a current.

According to one aspect, an apparatus for controlling hydrogen purging, may include a purging valve provided for an outlet disposed near (e.g., adjacent to) an anode of a fuel cell stack and configured to adjust an outflow of water from the fuel cell stack; and a controller configured to adjust an opening of the purging valve based on a charge capacity obtained by integrating a current of the fuel cell stack, wherein the controller is configured to calculate the charge capacity by multiplying the current of the fuel cell stack by a scale factor when a load for an output current of the fuel cell stack is less than a first reference load which is preset.

The controller may also be configured to open the purging valve when the calculated charge capacity is greater than a preset charge capacity. The controller may be configured to set the scale factor to 1 when the load for the output current of the fuel cell stack is greater than a second reference load which is preset. When the load is greater than the first reference load and less than the second reference load, the controller may be configured to reduce the scale factor with a predetermined gradient from a time point at which the load becomes greater than the first reference load.

According to another aspect of the invention, a method for controlling hydrogen purging, may include comparing a load for an output current of a fuel cell stack with a first reference load which is preset, and calculating a charge capacity by multiplying an output current of the fuel cell stack by a scale factor when the load is less than a first reference load which is preset.

The method may further include opening the purging value connected to an output terminal of an anode of the fuel cell stack when the calculated charge capacity is greater than a preset charge capacity; and setting the scale factor to 1 when the load is greater than a second reference load which is preset. The method may further include reducing the scale factor with a predetermined gradient from a time point at which the load becomes greater than the first reference load, when the load is greater than the first reference load and less than the second reference load.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
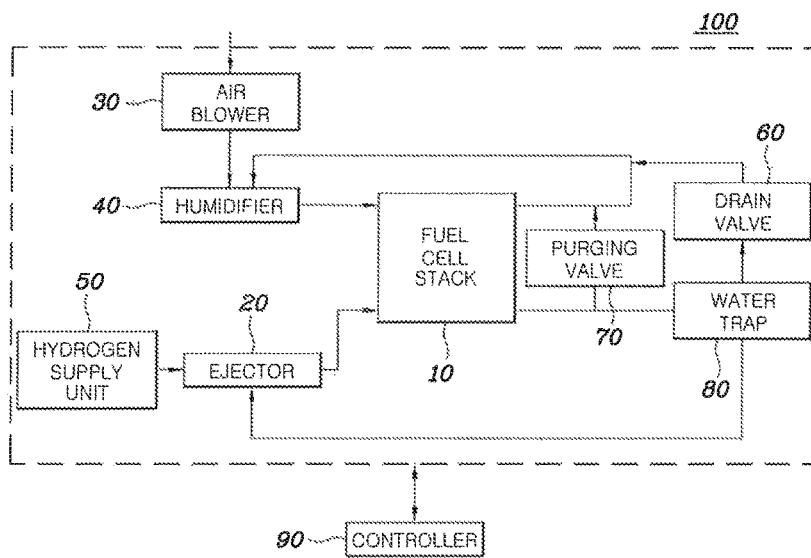
FIG. 1 is an exemplary block diagram illustrating a fuel cell system according to one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Specific structural and functional descriptions of exemplary embodiments of the present invention disclosed herein are merely for illustrative purposes of the embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention may be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts. FIG. 1 is an exemplary block diagram illustrating a fuel cell system 100 according to one exemplary embodiment of the present invention.

With reference to FIG. 1, the fuel cell system 100 according to one exemplary embodiment of the present invention may include a fuel cell stack 10, an ejector 20, an air blower 30, a humidifier 40, a hydrogen supply unit 50, a drain value 60, a purging valve 70, a water trap 80, and a controller 90. Some parts of the fuel cell system 100 illustrated in FIG. 1 are elements known to ordinary skilled persons in the art. Thus, such parts will not be described herein.

The hydrogen supply unit 50 may be a general hydrogen tank configured to store hydrogen with a substantially high pressure, and configured to supply the hydrogen to the fuel cell stack 10. The highly pressurized hydrogen which may be output from the hydrogen supply unit 50 may be reduced in pressure by a pressure regulator, a pressure adjusting value, an injector, a pressure adjusting actuator (not shown), etc., and may then be supplied to the fuel cell stack with a circulation gas suctioned by the ejector 20. The ejector 20 may be configured to supply the hydrogen of a reduced pressure to the fuel cell stack 10, and circulate the unused hydrogen by suctioning the unused hydrogen, which may remain around (e.g. surrounding) an anode of the fuel cell stack, using a low pressure caused by a hydrogen jet stream when the highly pressurized hydrogen passes through a nozzle (e.g., convergent nozzle or divergent nozzle).

The purging valve 70 may be a valve used to remove impurities in the anode of the fuel cell stack 10. Water may be produced through an electrochemical reaction in the fuel cell collects inside the fuel cell stack 10 and should be effectively discharged outside the fuel cell stack. When the water may not be discharged outside the fuel cell stack 10, that is, when flooding occurs, supply of hydrogen as fuel may be impeded, thus lowering electricity generation efficiency of the fuel cell stack 10. When drainage of water is substantially poor (e.g., water drainage is difficult), the parts of the fuel cell stack 10 may be damaged and may malfunction.

To facilitate drainage of the water from the anode, the flow rate of hydrogen in the fuel cell stack 10 may be increased to increase the stream of liquids (e.g., a gas mixture including moisture) in the fuel cell stack. Accordingly, periodic fuel purging may be performed. In other words, to remove moisture that remains in the fuel cell stack 10, the purging valve 70 may be opened to temporarily increase the flow rate of hydrogen in the fuel cell stack 10. The primary purposes of the purging which may be started by opening the purging value 70 are reducing the concentration of nitrogen drawn to the anode and draining the water collected in the fuel cell stack 10. However, since such purging may cause discharge of hydrogen outside the fuel cell stack 10, fuel efficiency may deteriorate and pollution may occur to the environment.

The controller 90 may be configured to operate the opening of the purging valve 70 to adjust the degree of purging. In particular, the controller 90 may be configured to integrate the capacity of current generated in the fuel cell stack 10 and adjust the purging valve 70 to cause the purging to be performed when a charge capacity exceeds a predetermined charge capacity. This operation is based on the principle that the current generated through the electrochemical reaction is proportional to the amount of produced water. However, since the characteristics of the stream of hydrogen which is related to the concentration of fuel is not taken into consideration in the operation, the flow of the hydrogen in the fuel cell system 100 may be weaker at a substantially low load than at a substantially high load, thus causing an increase in the amount of water in the fuel cell stack 100.

Accordingly, the controller 90 may be configured to determine whether the load is greater than a predetermined value, and in response to determining that the load is less than the predetermined value, the controller 90 may be configured to calculate a charge capacity by multiplying the current by a scale factor and integrating for an actual current. When the calculated charge capacity exceeds a predetermined value, the controller 90 may be configured to adjust the purging value 90 to perform the purging. Under the substantially low load condition, the actual current may be multiplied by the scale factor to produce the charge capacity. Accordingly, the number of times of the opening of the charging valve 70 may be increased (e.g., the number of times that the valve is opened may increase). When the purging value 70 is opened to cause the purging to be performed, the moisture in the fuel cell stack 10 may be removed to thus increase the flow rate of hydrogen in the fuel cell stack 10.

Figure 2A:
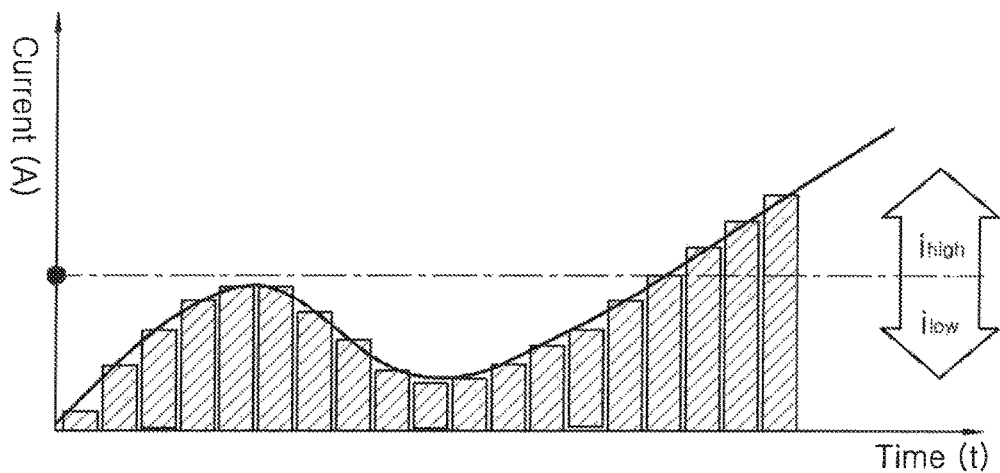
FIG. 2A is an exemplary bar graph showing integral value of a current according to a related art.
Figure 2B:
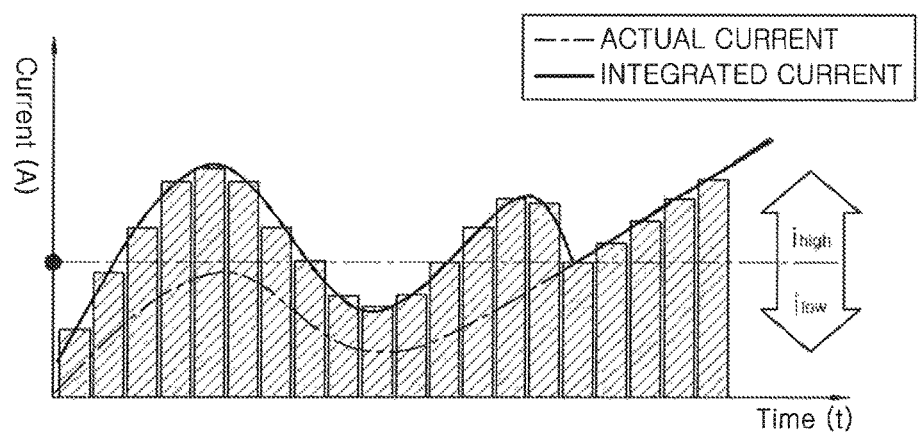
FIG. 2B is an exemplary bar graph showing integral value of a current used in a method for controlling hydrogen purging according to one exemplary embodiment of the present invention.

FIGS. 2A and 2B are exemplary graphs showing integral values of the current. In particular, FIG. 2A is an exemplary graph according to a related art, and FIG. 2B is an exemplary graph according to one exemplary embodiment of the present invention.

As illustrated in FIG. 2A, according to the integral logic of the current according to the related art, the actual current and the current used in the integral operation are the same. When the charge capacity is calculated through the integral operation of the current, and when the calculated charge capacity is equal to or greater than a predetermined charge capacity, the controller 90 performs the purging by opening the purging valve 70.

Furthermore, as illustrated in FIG. 2B, according to the integral logic according to one exemplary embodiment of the present invention, the actual current and the current used in the integral operation are different since the scale factor $\alpha_{scale}$ may be multiplied. When the calculated charge capacity is equal to or greater than the predetermined charge capacity, the purging may be performed by opening the purging valve 70 based on the purging logic in which the charge capacity may be obtained by performing the integral operation on the current multiplied by the scale factor $\alpha_{scale}$. As the current increases, the charge capacity obtained through the integral operation may also correspondingly increase. Accordingly, unlike the method illustrated in FIG. 2A, the purging in the present invention may be performed with a shorter period of time. The method may be expressed by Formula 1.

$$Q = \int (\alpha_{scale} i_{low} + i_{high}) dt \qquad \text{Formula 1}$$

Wherein, Q is a charge capacity, $\alpha_{scale}$ is a scale factor, $i_{low}$ is a current under a condition of low load, and $i_{high}$ is a current under a condition of high load. In other words, only under the condition of substantially low load, the scale factor is multiplied to produce the total charge capacity.

Figure 3:
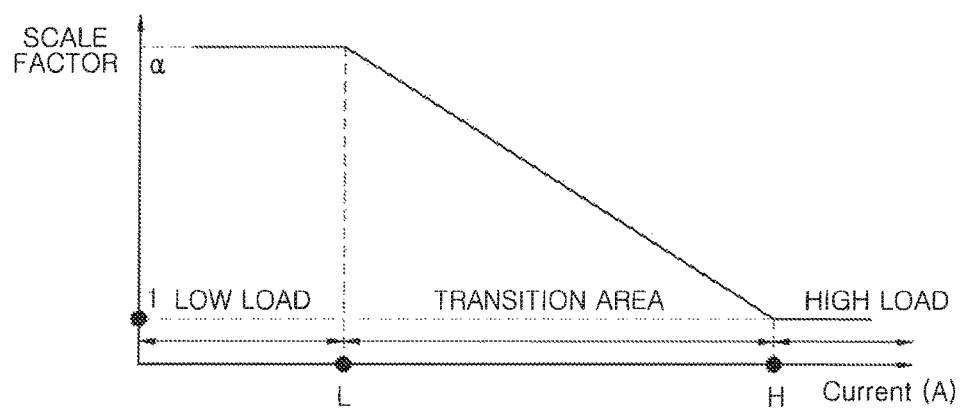
FIG. 3 is an exemplary line graph illustrating fluctuation in scale factor $\alpha_{scale}$ used in the method for controlling hydrogen purging according to one exemplary embodiment of the present invention.

FIG. 3 is an exemplary line graph illustrating fluctuation in scale factor $\alpha_{scale}$ used the method for controlling hydrogen purging according to one exemplary embodiment of the present invention. As illustrated in FIG. 3, the scale factor $\alpha_{scale}$ may have a value of about a in a substantially low load area and the value of about 1 in a high load area. A transition area exists between the substantially low load area and the substantially high load area. The value of the scale factor $\alpha_{scale}$ decreases with the gradient calculated by Formula 2 within the low load area, and converges on 1 as entering the high load area.

$$\frac{1-\alpha}{H-L} \qquad \text{Formula 2}$$

Wherein H is a reference current value indicating the high load area, L is a reference current value indicating the low load area, and $\alpha$ is a scale factor in the low load area.

Although an exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for controlling hydrogen purging, the apparatus comprising:
   a purging valve provided for an outlet disposed adjacent to an anode of a fuel cell stack and configured to adjust an outflow of water from the fuel cell stack; and
   a controller configured to:
   adjust an opening of the purging valve based on a charge capacity obtained by integrating a current of the fuel cell stack, wherein the controller calculates the charge capacity with the current of the fuel cell stack, in which the charge capacity is obtained by multiplying a current under a condition of low load by a scale factor; adding the multiplied current value and a current under a condition of high load; and integrating a summation of the multiplied current value and the current under the condition of high load, when a load for an output current of the fuel cell stack is less than a first reference load which is preset, and wherein the controller is configured to open the purging valve when the calculated charge capacity is greater than a preset charge capacity.

2. The apparatus according to claim 1, wherein the controller is configured to set the scale factor to 1 when the load for the output current of the fuel cell stack is greater than a second reference load which is preset.

3. The apparatus according to 2, wherein the controller is configured to reduce the scale factor with a predetermined gradient from a time point at which the load becomes greater than the first reference load, when the load is greater than the first reference load and less than the second reference load.

4. A non-transitory computer readable medium containing program instructions executed by a controller, the computer readable medium comprising:

program instructions that compare a load for an output current of a fuel cell stack with a first reference load which is preset;

program instructions that integrate the output current of the fuel cell stack and calculate a charge capacity with the current of the fuel cell stack, in which the charge capacity is obtained by multiplying a current under a condition of low load by a scale factor; adding the multiplied current value and a current under a condition of high load; and integrating a summation of the multiplied current value and the current under the condition of high load, when the load is less than a first reference load which is preset; and program instructions that open a purging value connected to an output terminal of an anode of the fuel cell stack when the calculated charge capacity is greater than a preset charge capacity.

5. The non-transitory computer readable medium of claim 4, further comprising:

program instructions that set the scale factor to 1 when the load is greater than a second reference load which is preset.

6. The non-transitory computer readable medium of claim 5, further comprising: program instructions that reduce the scale factor with a predetermined gradient from a time point at which the load becomes greater than the first reference load, when the load is greater than the first reference load and less than the second reference load.

* * * * *